US012489194B2

(12) United States Patent
Raynesford

(10) Patent No.: US 12,489,194 B2
(45) Date of Patent: Dec. 2, 2025

(54) ANTENNAS WITH LIGHT SOURCE

(71) Applicant: Sensormatic Electronics, LLC, Boca Raton, FL (US)

(72) Inventor: Steven J. Raynesford, Boca Raton, FL (US)

(73) Assignee: Sensormatic Electronics, LLC, Boca Raton, FL (US)

( * ) Notice: Subject to any disclaimer, the term of this patent is extended or adjusted under 35 U.S.C. 154(b) by 136 days.

(21) Appl. No.: 18/265,123

(22) PCT Filed: Dec. 2, 2021

(86) PCT No.: PCT/US2021/072687

§ 371 (c)(1),
(2) Date: Jun. 2, 2023

(87) PCT Pub. No.: WO2022/120356

PCT Pub. Date: Jun. 9, 2022

(65) Prior Publication Data

US 2024/0006739 A1 Jan. 4, 2024

Related U.S. Application Data

(60) Provisional application No. 63/121,704, filed on Dec. 4, 2020.

(51) Int. Cl.
*H01Q 1/06* (2006.01)
*F21V 7/10* (2006.01)
(Continued)

(52) U.S. Cl.
CPC ................ *H01Q 1/06* (2013.01); *F21V 7/10* (2013.01); *F21V 19/001* (2013.01);
(Continued)

(58) Field of Classification Search
CPC ........ F21V 29/503; F21V 7/10; F21V 19/001; H01Q 1/06; H01Q 1/44; H01Q 1/0407
See application file for complete search history.

(56) References Cited

U.S. PATENT DOCUMENTS 9,184,497 B2 * 11/2015 Chen ..................... H05B 45/00
9,559,407 B2 * 1/2017 Van Dijk ................ H01Q 1/02
(Continued)

FOREIGN PATENT DOCUMENTS

EP 3255339 A1 12/2017
JP 2002198714 A 7/2002
(Continued)

OTHER PUBLICATIONS

International Search Report and Written Opinion for International Patent Application No. PCT/US2021/072687, mailed on Mar. 14, 2022 (9 pages).

*Primary Examiner* — Zheng Song
(74) *Attorney, Agent, or Firm* — ArentFox Schiff LLP

(57) ABSTRACT

An antenna for providing light is disclosed. The antenna may comprise a substrate having at least two domains and a light source which is connected to two domains. The light source may emit light when a direct current flows from one domain to another domain. A radio frequency (RF) current flows through the domains for generation of radio waves. A capacitor is provided between adjacent domains to provide a path for the RF current to bypass the light source. The substrate is enabled to absorb the heat dissipated by the light source. The substrate is coated with a reflective material to reflect impinging light rays.

6 Claims, 3 Drawing Sheets

(51) Int. Cl.

| | |
|---|---|
| ***F21V 19/00*** | (2006.01) |
| ***F21V 29/503*** | (2015.01) |
| *F21Y 107/90* | (2016.01) |
| *F21Y 115/10* | (2016.01) |

(52) U.S. Cl.

CPC ......... *F21V 29/503* (2015.01); *F21Y 2107/90* (2016.08); *F21Y 2115/10* (2016.08)

(56) References Cited

U.S. PATENT DOCUMENTS

| | | | | |
|---|---|---|---|---|
| 10,355,340 | B2 * | 7/2019 | Marinus | F21K 9/232 |
| 11,143,393 | B2 * | 10/2021 | Van Der Zanden | H01Q 1/22 |
| 11,158,926 | B2 * | 10/2021 | Zhao | F21V 23/045 |
| 11,469,509 | B2 * | 10/2022 | Globisch | H01Q 9/16 |
| 11,871,512 | B2 * | 1/2024 | Jiang | H05K 1/0274 |
| 2015/0270597 | A1 * | 9/2015 | Kough | H01Q 9/27<br>343/895 |
| 2019/0056072 | A1 * | 2/2019 | Gielen | F21V 31/04 |
| 2023/0265990 | A1 * | 8/2023 | Kuban | H05K 1/056<br>361/679.01 |
| 2024/0006739 | A1 * | 1/2024 | Raynesford | F21V 7/10 |
| 2024/0128640 | A1 * | 4/2024 | Zweers | H01Q 1/364 |

FOREIGN PATENT DOCUMENTS

| | | | | |
|---|---|---|---|---|
| WO | WO-2014173852 | A1 * | 10/2014 | H01Q 13/16 |
| WO | WO-2017067793 | A1 * | 4/2017 | H01Q 1/44 |
| WO | 2018206343 | A1 | 11/2018 | |

* cited by examiner

ANTENNAS WITH LIGHT SOURCE

CROSS-REFERENCE TO RELATED APPLICATION

This application is a 35 U.S.C. § 371 National Stage Application of International Patent Application No. PCT/US2021/072687, entitled "RF ANTENNA AS LIGHTING ELEMENT SUBSTRATE," filed Dec. 2, 2021, which claims priority to U.S. Application No. 63/121,704, entitled "ANTENNAS WITH LIGHT SOURCE," filed on Dec. 4, 2020, the disclosures of which are incorporated by reference herein in their entireties.

BACKGROUND

Conventionally, antennas are utilized only for wireless communication purpose and various techniques have been employed for enhancing operational capabilities. The use of wireless communication networks, especially with various types of antennas, has grown quickly in the automation, control, security and other industries. One reason for this growth is that antennas can be installed relatively quickly and inexpensively, without the need to run hard wires and cables for data signal transmission and control.

While the conventional antennas do suffice the need of wireless communication using different types of communication methodologies, there is still a greater need of improvement of antennas that can provide increased functionality and performance in many other demanding applications in the diverse field of use, wherein the improvement may convert the conventional antenna into a dual-function device.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect, the present disclosure concerns an antenna for providing light. The antenna comprises a substrate having at least two domains, and a light source connected to the domains, wherein the light source emits light when a current flows from one domain to another domain.

The following examples are illustrative only and may be combined with aspects of other embodiments or teachings described herein, without limitation. In an example, an antenna comprises a substrate having at least two domains, and a light source connected to the domains, wherein the light source emits light when a current flows from one domain to another domain. In some examples, the current is a direct current. In some examples, a radio frequency (RF) current flows through the domains for generation of radio waves. In some examples, a capacitor is provided between adjacent domains to provide a path for RF current to bypass the light source. Additionally, in some examples, a capacitor is provided between adjacent domains to provide a path for RF current to bypass the light source. In some examples, the substrate is coated with a reflective material to reflect impinging light rays.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION

Overview

An antenna for providing light is disclosed. The antenna may comprise a substrate having at least two domains and a light source which is connected to two domains. The light source may emit light when a direct current flows from one domain to another domain. A radio frequency (RF) current flows through the domains for generation of radio waves. A capacitor is provided between adjacent domains to provide a path for the RF current to bypass the light source. The substrate is enabled to absorb the heat dissipated by the light source. The substrate is coated with a reflective material to reflect impinging light rays Antennas with Light Source The present disclosure envisages an antenna having one or more light sources. Light rays emitted from the one or more light sources provided on the antenna can be utilized for providing backlight to an advertising sheet that is placed on the antenna. The light may further illuminate an area to enhance RFID operation and for providing visual notifications such as error, inactive, success, and the like via the surface of the antenna. Additionally, the envisaged antenna is compact and therefore can be employed in space-limited applications.

Figure 1:
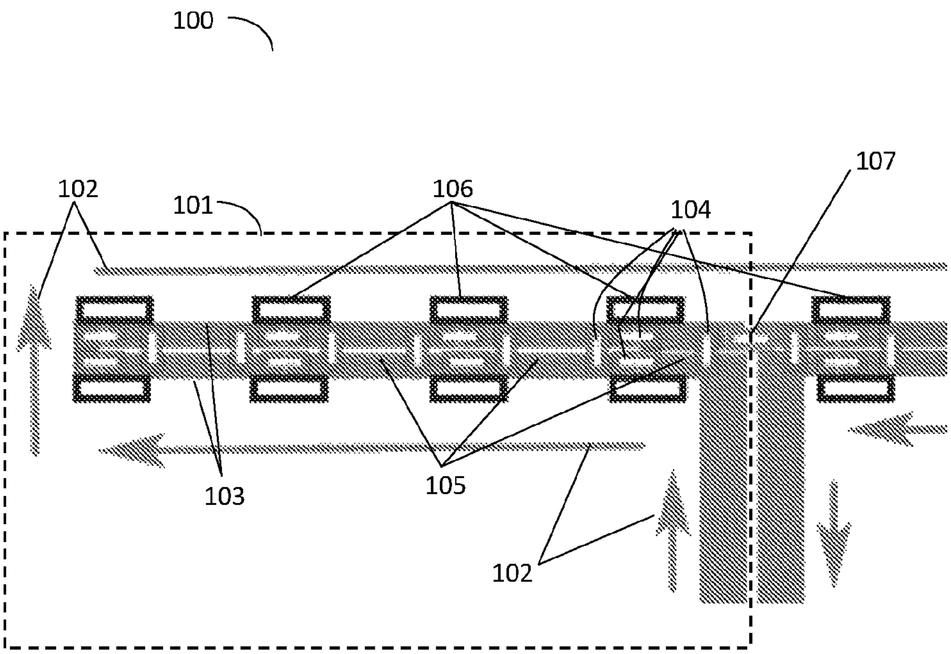
FIG. 1 is a zoom-in view of a dipole antenna with lighting arrangement, according to some embodiments.

Referring now to FIG. 1, a zoom-in view of a dipole antenna 100 is shown, according to some embodiments. FIG. 1 depicts a single side (block 101) of the dipole antenna 100. The dipole antenna 100 is provided with one or more light sources 106. In an embodiment, the one or more light sources 106 may be provided on both sides of the dipole antenna 100.

The dipole antenna 100 comprises a substrate 103 that facilitates the flow of a direct current and a radio frequency (RF) current. The substrate 103 is provided with one or more conductive materials to enable the flow of the direct current and the RF current therethrough. The direction of the flow of the direct current is shown by arrows 102. In one embodiment, the conductive materials may be buried within the substrate 103 using multi-layer PCB. Additionally, concentrated field of stitch vias and one or more capacitors may be employed to make the layers and substrate 103 appear as a single conductor for propagating RF signal.

In an embodiment, the dipole antenna 100 is operated by the RF current for generation of radio waves. An operating frequency of the RF current may be any one of a high frequency, very high frequency, and a specific frequency as set by the user for generation of the radio waves. The RF current may flow through the dipole antenna 100 thereby causing radio waves to be radiated outward from the dipole antenna 100.

Still referring to FIG. 1, the substrate 103 is partitioned into two or more domains 105. The light source 106 is connected to each of the two domains 105, wherein each terminal of the light source 106 is connected to a domain.

The light source 106 is configured to illuminate or emit light when the direct current flows from one domain to another domain. The domains 105 may vary in size and shape. In an embodiment, the light source 106 may be one of, but not limited to, a light emitting diode, an organic electroluminescent diode, and the like.

In an exemplary embodiment, one domain 105 may cover a majority of the portion of substrate 103 and may be referred as a common current domain (not shown in figures). The other domains 105 may be in form of vias and pads.

In one embodiment of the present disclosure, one or more capacitors 104 are connected between the domains 105. The capacitor 104 is employed to provide a path for the RF current to bypass one or more light sources 106. Typically, capacitor 104 may be utilized for providing a path between adjacent domains 105 irrespective of the domain's association with lighting source 106.

In an embodiment, the dipole antenna 100 is provided with an RF choke 107. The RF choke 107 is connected with the two sides of the dipole antenna 100. The RF choke 106 is an inductor with the purpose of choking off or suppressing RF current (RF signals), including signals from radio frequency (RF) devices, and allowing the passage of low-frequency signals and the direct current. The RF choke 106 rejects all frequencies and passes only the direct current. The RF choke 106 may have a high impedance over a range of frequencies it is designed to suppress.

Figure 2:
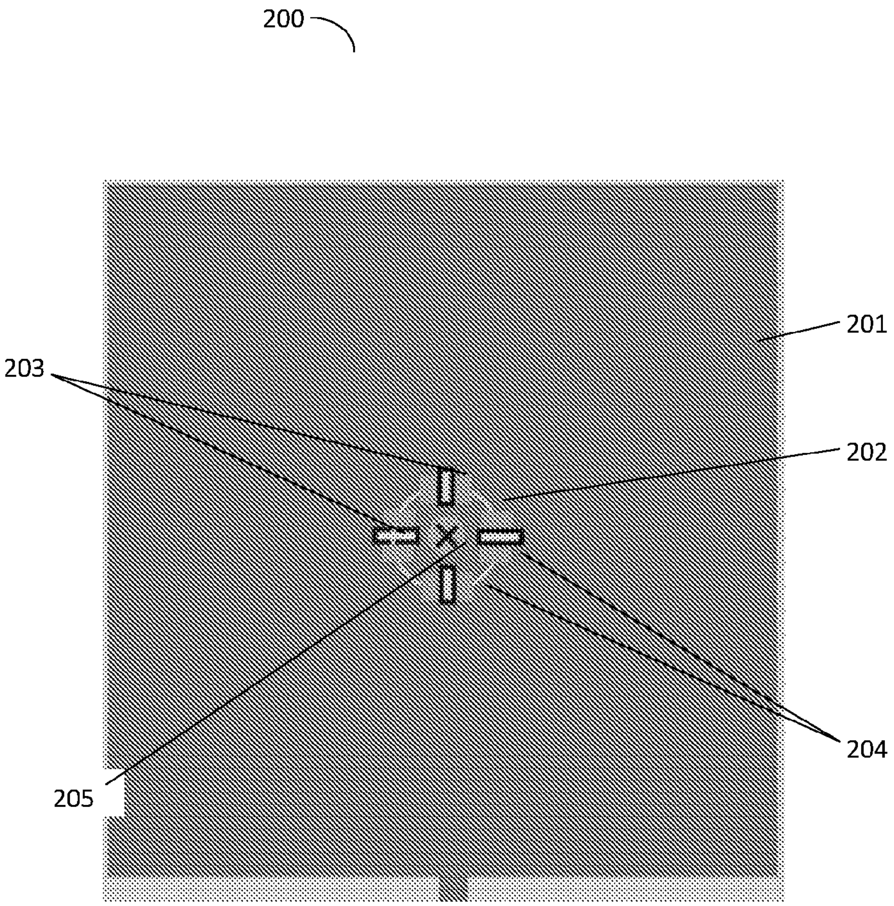
FIG. 2 is a schematic view of a patch antenna with lighting arrangement, according to some embodiments.

Referring now to FIG. 2, a patch antenna 200 with lighting arrangement is shown according to some embodiments. The surface of patch of the patch antenna 200 functions as a substrate 201. The substrate 201 is partitioned into at least two domains (not specifically labelled) by a partition 202.

One or more light sources 203 are connected between the two domains defined by the partition 202. The one or more light sources 203 are illuminated by a direct current. Additionally, one or more capacitors 204 are employed to provide path for an RF current to bypass the light source 203.

Typically, a screw 205 is fastened at the center of the patch antenna 200. The screw 205 is adapted to provide a path to ground the direct current and the RF current. Further, the screw 205 may facilitate transfer of heat generated by the light source 203.

In an embodiment, the electric fields are concentrated on the underside of the patch facing the ground plane and on the edges of top plane where the electric fields curve around to the ground plane. The light source 203 that is near the center or away from the edges may have minimum impact on the RF signals.

The direct current provided to the patch antenna 200 may enable the light sources 203 to emit light and illuminate the region around the patch antenna 200.

In an embodiment, the partition 202 in FIG. 2 is shown to have a circular shape, however, the partition 202 may have different shapes. The shape of the partition 202 may be one of, but is not limiting to, oval, rectangular, square, quadrilateral and the like. FIG. 2 is shown to have a single partition 202 but the patch antennas 200 may be provided with a plurality of partitions leading to formation of plurality of current domains.

Figure 3:
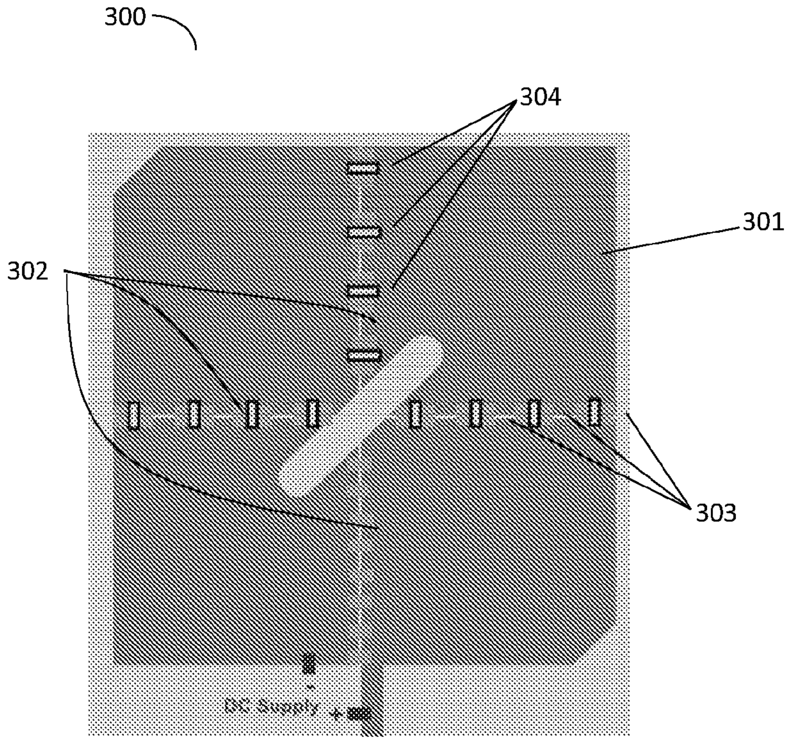
FIG. 3 is a schematic view of a patch antenna with an alternate lighting arrangement, according to some embodiments.

FIG. 3 discloses an alternate configuration of a patch antenna 300 with lighting arrangement. The surface of the patch functions as a substrate 301. The substrate 301 may be divided into one or more parts, by one or more partitions 302, defining domains.

One or more capacitors 303 are attached to the domains for the transmission of the RF current. One or more light sources 304 may be attached between the domain of the substrate 301 and over the partitions 302. When the direct current flows from one domain to another, the light sources 304 emit light.

In an embodiment, the substrate (103, 201, and 301) may be polished or coated with a reflective material to function as light reflector, i.e., to enable reflection of light rays impinging on its surface. The light rays impinging on the substrate may be associated with one or more light sources.

In an embodiment, the dipole antenna 100 or the patch antennas (200 and 300) are retrofitted and modified to function as a new lighting product with the direct current supply and addition of light source. The retrofitting of antennas (100, 200, and 300) maintains the primary function of communication and additionally functions as an illuminating means with the usage of a light source.

In an embodiment, the retrofitting is made with minimal physical changes in the antennas (100, 200, and 300) wherein the retrofitting is made with space limited installation i.e. no extra space is occupied with the retrofitting disclosed in the present disclosure.

In an embodiment, the retrofitting or the modifications made in the antennas may provide the following benefits/advantages:

- Provision of light to the space present near the antennas.
- Provision of backlight for advertising sheets which may be placed over the RF antennas or towers.
- Provision of illumination in dark areas.
- Providing the working state or status of antenna through visual notifications, wherein illumination of one or more light sources may indicate:
  - Active device;
  - Inactive device;
  - Error in transmission;
  - Success in transmission; or
  - Other conditions.

Although the present disclosure describes usage of dipole antenna and patch antenna. It is to be understood that any other type of antenna can be employed and the disclosure in no way is restricted only to dipole and patch antenna.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

While the invention has been described in detail and with reference to specific examples thereof, it will be apparent to one skilled in the art that various changes and modifications can be made therein without departing from the spirit and scope thereof.

What is claimed is:

1. A dipole antenna for providing light, the dipole antenna comprising:

two sides, each of the two sides comprising:
- a substrate having at least two domains;
- a light source connected to the domains; and
- a capacitor coupled to the at least two domains and configured to provide a path for radio frequency (RF) current to bypass the light source; and a RF choke electrically coupled to the two sides;

wherein the light source emits light when a current flows from one domain to another domain.

2. The dipole antenna of claim 1, wherein the current is a direct current.

3. The dipole antenna of claim 1, wherein an RF current flows through the domains for generation of radio waves.

4. The dipole antenna of claim 1, wherein the substrate is enabled to absorb the heat dissipated by the light source.

5. The dipole antenna of claim 1, wherein the substrate is coated with a reflective material to reflect impinging light rays.

6. The dipole antenna of claim 1, wherein each of the two sides comprises:

a forward path and a reverse path; and a plurality of domains;

further comprises a plurality of capacitors, each of the plurality of capacitors electrically coupling a first domain in a first side of the two sides and a second domain in a second side of the two sides.

* * * * *